Dec. 15, 1936.  A. L. DE CARY  2,064,592
ADJUSTABLE SEAT CONSTRUCTION
Filed Aug. 9, 1934  3 Sheets-Sheet 2
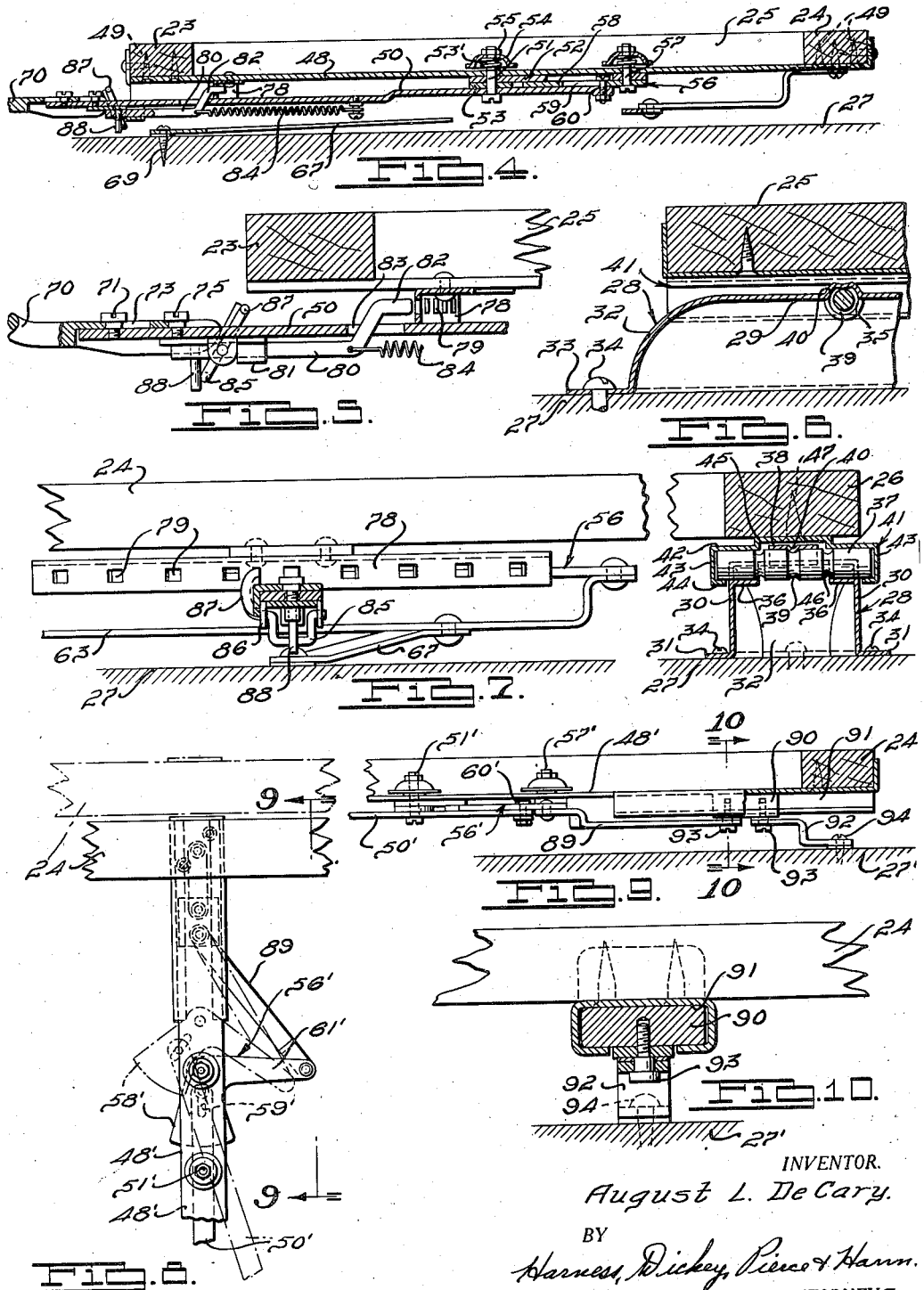
INVENTOR.
August L. De Cary.
BY
Harness, Dickey, Pierce & Hann.
ATTORNEYS.

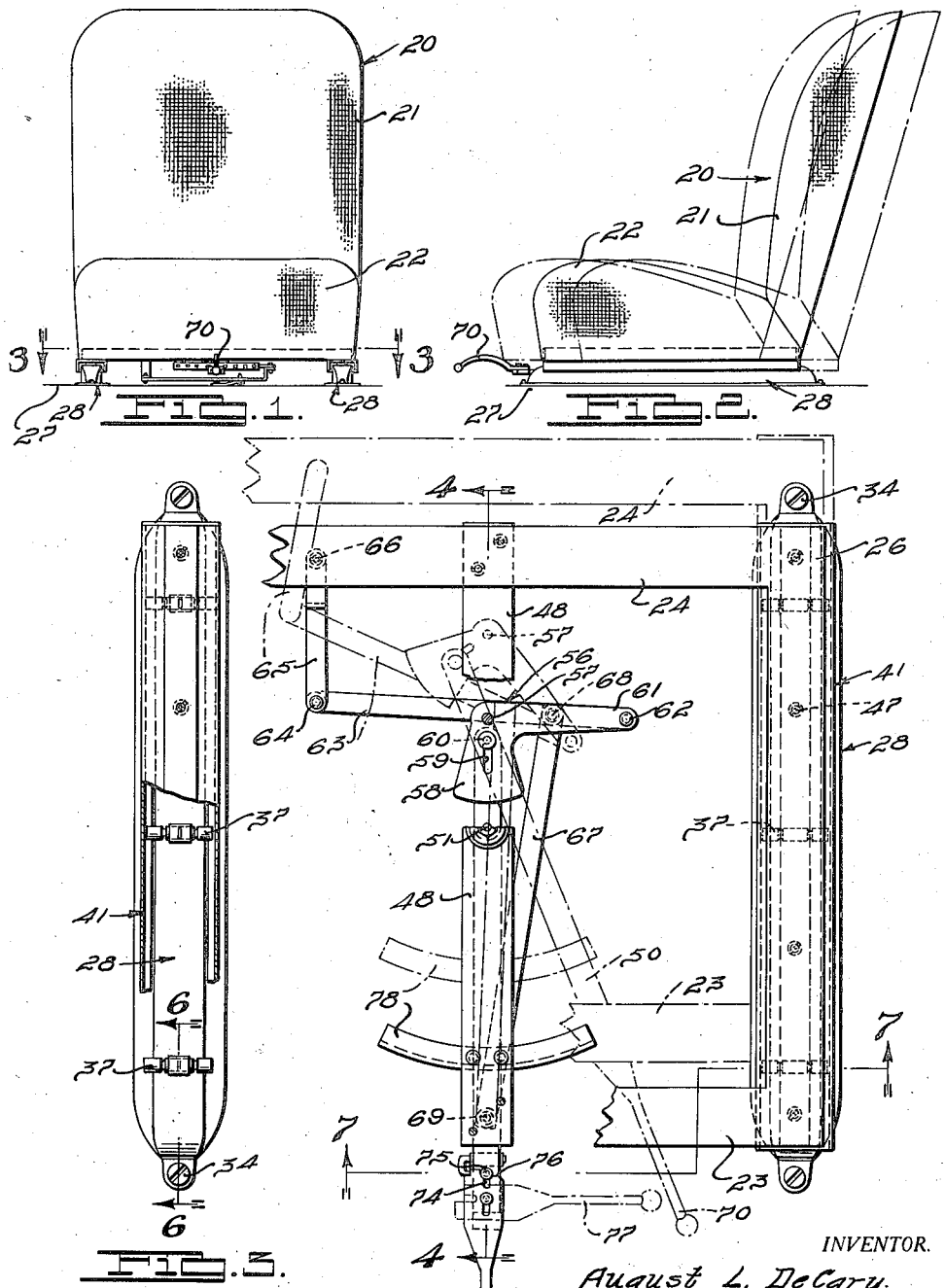

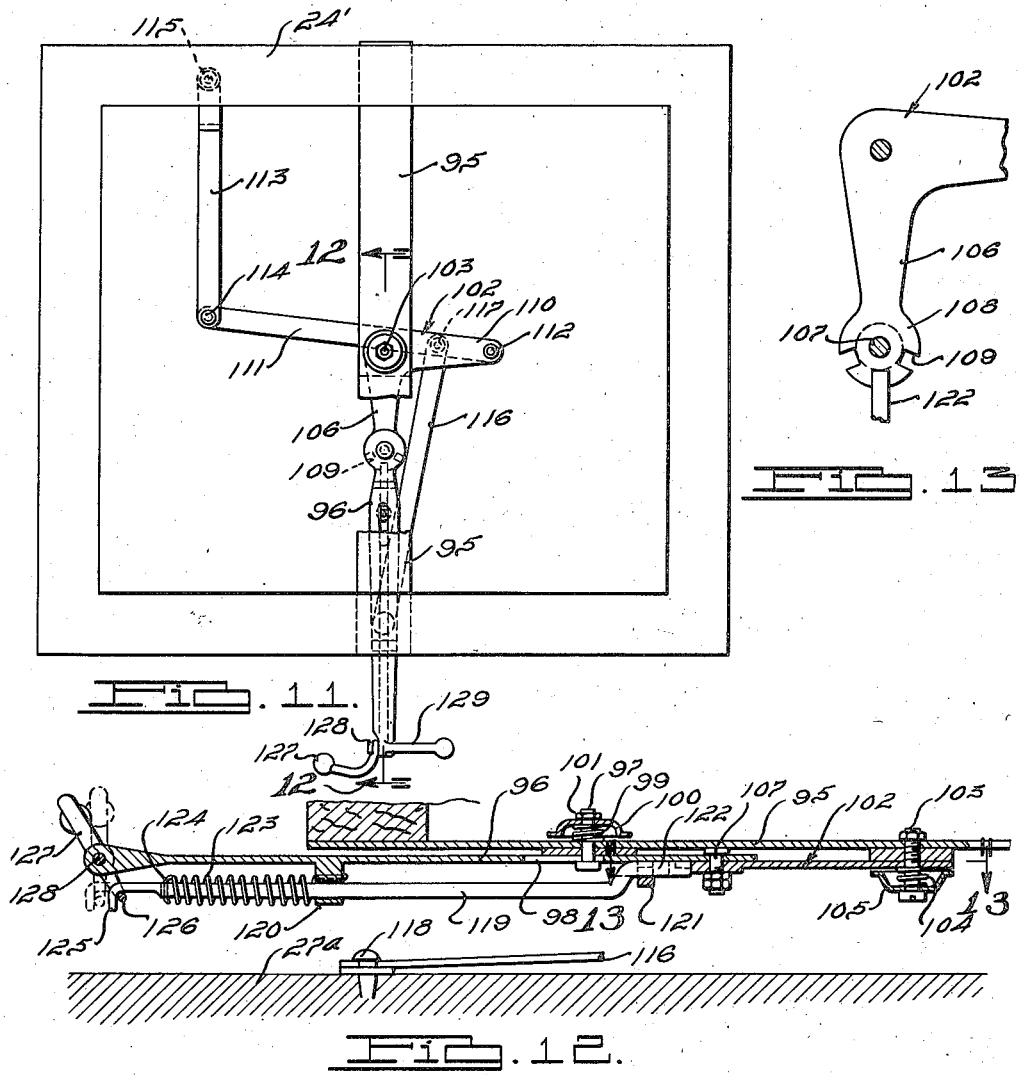

Patented Dec. 15, 1936

2,064,592

UNITED STATES PATENT OFFICE 2,064,592

ADJUSTABLE SEAT CONSTRUCTION

August L. de Cary, Detroit, Mich., assignor to Douglas, Lomason Company, a corporation of Michigan Application August 9, 1934, Serial No. 739,102

11 Claims. (Cl. 155—14)

This invention relates to improved apparatus for movably supporting articles and to improved adjusting and locking mechanism for articles, such as vehicle seats, movably supported thereon.

One of the main objects of the invention is to provide improved fixed tracks and relatively shiftable shoes, for movably supporting articles, which may be constructed from sheet metal by simple die forming operations.

Another object of the invention is to provide in tracks of this character, improved means for rotatably supporting and permanently retaining a plurality of cylindrical bearing elements at fixed locations on said rails by die forming the sheet metal of the tracks and without the aid of additional auxiliary structures of any kind.

A further object of the invention is to provide cooperating tracks and shoes which may be used in pairs or series of more than two in multiple rail systems and singularly in mono-rail systems of either overhead or ground type.

Further objects of the invention are to provide, from the sheet metal of the tracks, opposed bearing surfaces of limited areas which conform in curvature with the curvature of the cylindrical bearing elements and which engage opposite sides thereof in such a manner as to hold such elements against lateral displacement from the track; to provide the bearing elements and some of the bearing surfaces with cooperating grooves and ribs for holding the bearing elements against endwise displacement relative to their track; to provide tracks of this character which have substantially closed lateral sides by which the main bearing surfaces that support the cylindrical bearing elements are protected from injury; to provide improved shiftable shoes for movably supporting articles of this character which are also formable from sheet metal by simple die forming operations; to provide shoes of this character which are adapted to have contact with only a limited portion of the cylindrical bearing elements; to provide shoes of this character which are conveniently securable to an article or support; and to provide channel shaped shoes of this kind which have sides extending adjacent the extremity of the bearing elements and flanges extending inwardly and engageable with the peripheries of the bearing element so as to hold the shoes against displacement from the tracks.

Other objects of the invention are to provide cooperating shoes and tracks of the above character which are particularly adapted for adjustably supporting furniture, and seats such as are employed in vehicles; to provide sheet metal tracks and shoes of this kind which are so constructed and arranged as to provide a substantially complete enclosure for the cylindrical bearing elements and all the contacting parts of the structure that move relative to each other so as to guard the clothing of the occupants of such seats from injury by tearing or soiling; to provide shiftable seat supporting shoes which are positively held, by interengagement with the extremities of the track bearing elements, against lateral movement in either direction; and to provide an adjustable seat supporting structure which requires only a limited number of bearing elements.

Still further objects of the invention are to provide improved locking mechanism for releasably holding an adjustably mounted seat in a selected position; to provide manual seat adjusting apparatus which is adapted to move a shiftably mounted seat in respectively opposite directions; to provide apparatus of this kind which has an operating handle that is adapted to operate the seat adjusting and locking devices respectively in a predetermined sequence; to provide seat adjusting apparatus having an operating handle that moves with the seat and which is therefore not left in a forwardly protruding position after the seat is shifted rearwards nor is it rendered inconveniently accessible when the seat is shifted to its forward most position; to provide an operating handle of this character which swings into an inconspicuous position during the application of the locking mechanism; to provide seat adjusting apparatus by which a mechanical advantage may be gained during adjusting operations to enable the movement of the seat while occupied by the application of only slight effort; to provide a system of levers in the seat adjusting apparatus which exerts forces upon the seat that are directed accurately in the direction of its freedom of shifting movement so as to obviate all tendency of the seat to twist and to cause the shoes upon which it is supported to bind on the tracks with which such shoes are associated; and to provide a system of levers of this kind which applies forces in opposite directions substantially parallel to the tracks and at a location on the seat substantially midway between the tracks so as to thereby equalize the movement of respectively opposite ends of the seats.

The above being among the objects of the invention, the same consists in certain novel features of construction and combinations of parts to be hereinafter described with reference to the accompanying drawings and then claimed, having the above and other objects in view.

Illustrative embodiments of the invention are shown in the accompanying drawings, in which:

Fig. 1 is a front elevational view of a seat of the type used in vehicles which is adjustably supported by my improved tracks and shoes and provided with improved seat adjusting and locking mechanism embodying the invention.

Fig. 2 is a side elevational view of the seat, supporting structure and adjusting and locking apparatus shown in Fig. 1.

Fig. 3 is a plan view, partly in section, showing the tracks, shoes and locking and adjusting mechanisms as viewed from line 3—3 of Fig. 1.

Fig. 4 is a vertical longitudinal sectional view taken on the line 4—4 of Fig. 3, showing the seat locking mechanism in locked position.

Fig. 5 is a fragmentary view similar to Fig. 4 but showing the locking mechanism in unlocked position.

Fig. 6 is a vertical longitudinal sectional view taken on the line 6—6 of Fig. 3.

Fig. 7 is a transverse vertical sectional view taken on the line 7—7 of Fig. 3.

Fig. 8 is a fragmentary plan view of seat adjusting apparatus which embodies a modified form of the invention.

Fig. 9 is a longitudinal vertical sectional view taken on the line 9—9 of Fig. 8.

Fig. 10 is a transverse vertical sectional view taken on the line 10—10 of Fig. 9.

Fig. 11 is a plan view, similar to Fig. 3, but showing a further development of the invention.

Fig. 12 is a longitudinal vertical sectional view taken on the line 12—12 of Fig. 11.

Fig. 13 is a horizontal sectional view taken on the line 13—13 of Fig. 12.

For the purpose of illustrating the invention, a seat of the type used in vehicles is shown in the drawings equipped with my improved apparatus for movably supporting articles and movement adjusting and locking mechanisms. All of these structures, it should be understood, are adapted for use in conjunction with diverse articles of furniture and articles of other natures and particularly the apparatus for movably supporting articles is especially adapted for general conveyor use. In this connection it should be noted that, whereas the seat illustrated in the drawings is mounted on a pair of spaced upright tracks and cooperating shiftable shoes the tracks and shoes may be employed in any selected number in multiple rail conveyor systems and they may be used singularly in mono-rail systems of the upright rail type or in overhead suspended conveying systems.

In the form shown in Figs. 1 to 7, inclusive, of the drawings my invention is illustrated in conjunction with a seat, generally designated by the numeral 20, having an upright seat back 21 and a horizontal seat proper 22. The seat proper 22 has a rigid base structure comprising transversely extending front and rear cleats 23 and 24 respectively and spaced opposite side cleats 25 and 26.

Mounted on the floor or other supporting structure 27, in registration with the side cleats 25 and 26 of the seat proper 22, are spaced tracks generally designated by the numeral 28. Since these tracks are identical in construction, a description of one thereof will serve for both. Each track 28 is preferably formed from sheet metal by simple die forming operations. The tracks are of channel shape and they have an intermediate horizontal web portion 29 and spaced vertical side flanges 30 on the lower extremities of which are formed outwardly extending horizontal flanges 31 which serve as feet to retain the channel in an inverted position with the open side of the channel adjacent the floor or support 27. The extremities of the channel are at least partially closed by arcuately curved and downwardly projecting extensions 32 of the web portion 29 on which substantially horizontal flanges 33 are formed for engaging the floor or supporting structure 27. The tracks may be rigidly secured to the supporting structure 27 by screws 34 extending through apertures in the flanges 31 and 33 and anchored in the supporting structure. When tracks of this kind are used for movably supporting seats they are preferably made slightly longer than the depth of the seat while in conveying apparatus or in structures for movably supporting other articles the lengths of the tracks may be made to correspond with the requirements of the functions they are to perform.

Formed in the outer edge portions of the web 29 and adjacent upper edge portions of the side flanges 30 are spaced pairs of axially aligned substantially semi-cylindrical recesses 35 having semi-cylindrical walls 36 which provide bearing sockets. Disposed in each pair of bearing sockets 36 is a cylindrical bearing 37 which extends transversely of the track 28 and which has a peripheral portion projecting above the web 29 and opposite end portions projecting outwardly beyond the side flanges 30 of the track. The intermediate portion of the web 29 between the bearing sockets of each pair of bearing sockets 36 is struck upwardly and arcuately bent over the intermediate portion of the corresponding cylindrical bearing elements 37 to provide a tongue 38 for permanently holding the bearing element 37 against displacement from the track, as illustrated in Figs. 6 and 7 of the drawings. Formed in each cylindrical bearing element 37 subtantially midway between the ends thereof is a peripheral groove 39 in which is engaged a bead 40 depressed from the sheet metal tongue 38. The inter-engaged relationship of the groove 39 and bead 40 positively holds each bearing element against axial movement relative to the track.

Mounted on each track 28 is a shiftable shoe generally designated by the numeral 41 and comprising a sheet metal channel shaped structure having a central web 42 and downwardly extending substantially vertical side flanges 43 on the lower extremities of which are formed inwardly extending substantially horizontal flanges 44. The lateral side portions of the shoe 41, including the marginal edges of the web 42, vertical flanges 43 and inwardly extending flanges 44 embrace the outwardly projecting end portions of the cylindrical bearing elements 37 and thereby hold the shoe against displacement from the bearing elements which are in turn held by the tongues 38 against displacement from the track 28. A longitudinally extending outwardly projecting offset 45 is provided in the middle portion of the web 42 of the shoe 41 to accommodate the thickness of the metal of the tongues 38 and to provide a clearance between the tongues and the web. The side portions of the web 42 between the vertical flanges and adjacent shoulders of the offset 45 are in contact with the peripheries of the end portions of the bearing elements. Grooves 46 are formed in the peripheries of the bearing elements adjacent the inner edges of the bearing sockets 36 to permit the application of lubricant to the bearing surface of these parts so as to lubricate the latter and the peripheral portions of the bearing elements which contact with the shoe. The offset portion 45 of the web 42 of each shoe is secured to one of the side cleats of the seat structure preferably by screws 47.

The seat adjusting mechanisms and locking apparatus embodied in the forms of the invention illustrated in Figs. 1 to 7 inclusive; Figs. 8 to 10 inclusive; and Figs. 11 to 13 inclusive, respectively, are adapted to be used in conjunction with a seat which is movably mounted in the foregoing manner. In the form shown in Figs. 1 to 7 inclusive, the seat adjusting mechanism and locking apparatus includes a metal supporting plate 48 which extends substantially parallel to the tracks 26 and which is secured at its respectively opposite ends by screws 49 or other suitable means to the mid portions of the front and rear cleats 23 and 24 of the rigid base structure of the seat proper 22. Pivotally mounted on the supporting plate 48, intermediate the ends of the latter, is a lever 50. The lever 50 is pivotally attached to the plate 48 by a bolt 51 and it is held in spaced relation to the plate by a shim 52 and washer 53 having registering openings therein through which the bolt 51 extends. The threaded end of the bolt projects above the plate 48 and it is surrounded by a coil spring 53' which bears between a spring cup 54, held on the outer end of the bolt 51 by a nut 55, and the upper surface of the supporting plate 48.

A bell crank lever 56 is pivotally mounted on the supporting plate 48 between the pivotal axis of the lever 50 and the rear end portion of the plate 48 by a bolt 57 which is also provided with a coil spring, spring cup and nut that are arranged in the same manner as the corresponding parts associated with the bolt 51 and described above. The longitudinal axis of one arm 58 of the bell crank lever 56 is normally substantially parallel to the length of the supporting plate 48 when the seat is in its intermediate position of longitudinal adjustment and this arm is provided with a longitudinally extending slot 59 in which a cap screw mounted on the rear end of the lever 50 is slidably and pivotally engaged. The other arm 61 of the bell crank lever 56 normally extends transversely of the length of the plate 48 when the seat is in its intermediate position of longitudinal adjustment and when the lever 50 is substantially parallel to the length of the supporting plate, as viewed in full lines in Fig. 3. Pivotally mounted at 62 on the outer extremity of the arm 61 of the bell crank lever 56 is a link 63 extending transversely of the plate 48. The left end of the link 63 is pivotally attached at 64 to a link 65 which extends substantially parallel to the plate 48 when the seat is in its forwardmost position and which has its rear end pivotally attached at 66 to the rear cleat 24 of the rigid base structure of the seat proper 22. The movement of the link 63 is constrained and confined to a definite locus by a link 67 having its rear end pivotally attached at 68 to the link 63 and its forward end pivotally attached at 69 to the floor or supporting structure 27.

The foregoing seat adjusting mechanism and the locking apparatus, hereinafter described, is adapted to be controlled by a manual control lever 70 which extends forwardly from the front end of the lever 50 and which is slidably mounted on the latter by a cap screw 71 extending through a slot 73 in the manual control lever 70. Formed in the rear extremity of the lever 70 is a notch 74 which is adapted to receive a cap screw 75 mounted on the lever 50 when the operating lever 70 is disposed substantially parallel to the lever 50 and moved to its rear position so as to thereby hold the operating lever against pivotal movement relative to the lever 50 and to enable manipulation of the latter by the operating lever. The formation of the notch 74 in the extremity of the lever 70 provides spaced prongs thereon, one of which is partially cut off as illustrated at 76 to accomodate pivotal movement of the operating lever relative to the lever 50, to the inconspicuous dot and dash line position illustrated at 77 in Fig. 3. This may be accomplished by extending the operating lever 70 forwardly until the shortened prong 76 thereof will clear the cap screw 75 during counter-clockwise rotation of the lever 70 to its dot and dash line position.

The locking apparatus includes a metal segment 78 of angular cross-section having a plurality of spaced apertures 79 therein for receiving a locking bar 80 which is slidably mounted in a bearing 81 on the lower side of the lever 50. The bar 80 has an upwardly offset end portion 82 which extends through a slot 83 in the lever 50 and which is adapted to engage in any one of the openings 79 with which it registers. The locking bar 80 is normally urged rearwardly and releasably held in a locking position by a spring 84.

Lock releasing means which is operable by the rearward shifting of the operating lever 70 is mounted on the front end portion of the lever 50. This device comprises a yoke 85 which is journalled in apertures formed in spaced ears 86 extending downwardly from the sides of the lever 50. The yoke 85 has an upwardly extending semi-ring-shaped extension 87 which is disposed in the path of the movement of the rear extremity of the operating lever 70. The yoke is adapted to be rotated from the position shown in Fig. 4 in a clockwise direction by the rear extremity of the lever 70 when the latter is shifted rearwardly to bring it into operative relationship with respect to the lever 50. During this clockwise rotation of the lock releasing means, as viewed in Fig. 4, the yoke portion 85 thereof bears forwardly upon a pin 88 carried by the locking bar 80 and moves the latter forwardly against the action of the spring 84 so as to retract the rear end portion of the locking bar from the aperture 79 of the segment 78 in which it was previously engaged. This action brings the parts of the locking mechanism to the respective positions illustrated in Fig. 5 and the locking mechanism is simultaneously released as the operating handle 70 is brought into an operative position.

After the operating handle 70 has been brought into an operative position the seat may be shifted rearwardly by movement of the operating lever and the lever 50 as a unit in a counter-clockwise direction about the pivot 51, as viewed in Fig. 3. Such movement of the lever 50 would cause a corresponding clockwise rotation of the bell crank lever 56 if pivotal movement of the latter were not constrained. The links 63 and 65 and the link 67 which is biased between the floor structure and the link 63, however, prevents this free pivotal movement of the bell crank lever 56 and in so doing causes the rotative force applied upon the lever 50 to exert a rearwardly directed force upon the plate 48 and rigid base structure of the seat proper. This force is applied at a location substantially mid-way between the tracks upon which the seat is mounted and in a direction substantially parallel to such tracks thereby obviating any tendency of the adjusting force to twist the seat relative to the tracks or to cause the shoes to bind. Forward movement of the seat is effected by counter-clockwise rotation of the lever 50 from the dot and dash line position, for example, to the full line position shown in Fig. 3. By virtue of the foregoing system of levers a mechanical advantage is gained which enables convenient adjustments of the seat while occupied by the application of force of relatively low magnitude and without requiring the occupants to jerk themselves bodily forwardly or to thrust rearwardly.

The seat adjusting apparatus, illustrated in Figs. 8, 9 and 10, is in some respects similar to the corresponding apparatus shown in Figs. 1 to 7, inclusive, and it may be provided with locking mechanism and an operating handle identical to that embodied in Figs. 1 to 7, inclusive. In this form of the invention a lever 50' is substantially identical to the lever 50 of Figs. 1 to 7, inclusive, and it is pivotally mounted at 51' to a supporting plate 48'. Pivotally mounted at 57' on the supporting plate 48' between the pivot 51' and the rear end of the supporting plate 48' is a bell crank lever 56'. This bell crank lever has an arm 58' pivotally connected to the rear end portion of the lever 50' by a bolt 60' mounted on the lever and slidably engaged in a slot 59' formed in the arm 58' of the lever 56'. The other arm 61' of the lever 56' is pivotally connected by a link 89 to a cross head block 90 with respect to which a channel 91, provided on the lower side of the rear end portion of the plate 48', is longitudinally slidable. The cross head block 90 is constrained against movement relative to the floor or supporting structure 27' by an offset link 92 attached at one end to the cross head block by a bolt 93 and to the floor structure by a screw 94.

The operation of this adjusting mechanism is similar to that of the adjusting mechanism shown in Figs. 1 to 7, inclusive. In this case the link 89, cross head block 90 and link 92 constrain pivotal movement of the bell crank lever 56' by the lever 50' during rotation of the latter in either direction and as a result the rotative effort applied on the lever 50' is converted to forces exerted rearwardly or forwardly upon the plate 48' and seat structure, depending upon the direction of rotation of the lever 50'.

In the form of the invention shown in Figs. 11 to 13, inclusive, the seat adjusting mechanism and locking apparatus are independently operable by separate manual control members. The adjusting mechanism includes a metal supporting plate 95 which is mounted and arranged on the rigid base structure of the seat proper in the same manner as the supporting plates 48 and 48' of the previously described forms of the invention. Pivotally mounted on the supporting plate 95 is a lever 96 which is pivotally supported by a bolt 97 extending through an aperture in the plate 95 and engaged in a slot 98 formed in the lever 96. The bolt 97 is provided with a coil spring 99, spring cup 100 and nut 101 identical in structure to the corresponding parts shown in Fig. 4. A bell crank lever 102 is pivotally mounted on the plate 95 between the bolt 97 and the rear end portion of the plate by a bolt 103 which is also provided with a spring and spring cup 104 and 105 respectively. The bell crank lever 102 has a forwardly extending arm 106 which is pivotally attached to the rearward extremity of the lever 96 by a bolt 107. Formed on the forward extremity of the arm 106 is a substantially circular head 108 in the periphery of which spaced slots 109 are provided. The bell crank lever 102 has a laterally extending arm 110 to the outer extremity of which one end of a link 111 is pivotally attached at 112. The other end of the link 111 is pivotally connected with the rear cleat 24' of the base structure of the seat by a link 113 having one end pivotally attached at 114 to the link 111 and having its other end pivotally attached to the rear cleat 24' at 115. Pivotal movement of the bell crank 102 about its pivotal axis 103 is constrained by a link 116 which is pivoted at 117 to the link 111 and pivotally attached to the floor structure 27ᵃ by a screw 118 or other suitable means.

The locking mechanism includes a locking bar 119 which is slidably mounted relative to the lever 96 in bearings 120 and 121 and carried by the lever 96. The rear end portion 122 of the lever 96 is adapted to engage in the notches 109 of the enlarged head 108 on the outer extremity of the bell crank lever arm 106 to hold the lever against unintended displacement from a selected position. The locking bar 119 is normally urged rearwardly to maintain the end portion 122 thereof in one of the notches 109 by a tension spring 123 secured at one end to the bearing 120 and having its other end portion 124 engaged in an aperture formed in the locking bar. Provided on the forward extremity of the locking bar 119 is a downwardly extending flange 125 which is engaged with a pin 126 carried by a manual latch control crank 127 which is pivotally mounted at 128 on the forward extremity of the lever 96. Rotation of the crank 127 in a clockwise direction, as viewed in Fig. 12, urges the locking bar 119 forwardly and disengages its rear end portion 122 from the notch 109 of the bell crank lever 102 in which it was previously engaged.

While the crank 127 is in its clockwise rotated position the lever 96 may be turned about its pivotal axis 97 by manipulation of a hand grip 129 rigidly attached to or formed integral with the front extremity of the lever 96. When the locking mechanism is thus released and the lever 96 is rotated in a clockwise direction, as viewed in Fig. 11, the bell crank lever 106 is turned in a counter-clockwise direction about its axis and since this turning movement of the bell crank lever is constrained by the links 111, 113 and 116 a rearwardly directed force is applied on the plate 95 and the seat structure is accordingly moved rearwardly carrying with it the adjusting mechanism and the locking apparatus. The lever 96 may be rotated in a counter-clockwise direction, as viewed in Fig. 11, to move the seat bodily forwardly. In either case the seat may be releasably held in its extreme forward position, and its extreme rearward position or in an intermediate position by bringing the rear end portion of the locking bar 122 into the notch 109 of the bell crank lever 102 with which it registers when the seat is in any one of these selected positions.

In all the foregoing forms of the seat adjusting mechanism the adjusting forces are applied upon the seat in a direction substantially parallel to the course of movement of the seat and at a location substantially mid-way between the tracks upon which the latter is movably mounted. Since the locking apparatus and adjusting mechanism move with the seat structure the operating controls thereof are not excessively exposed when the seat is in its rearward position nor are they rendered inaccessible by forward movement of the seat. The leverage systems of each of the foregoing seat adjusting mechanisms are so constructed and arranged that a mechanical advantage is gained thereby enabling movement of the seat while occupied by a force of comparatively low magnitude.

The tracks and their cooperating shoes may be conveniently formed from sheet metal by simple and inexpensive die forming operations. They may be mounted in upright positions as illustrated in the seat installation shown in the drawings or they may be suspended in an inverted position from overhead supporting structure. These tracks and shoes may be made to any desired length for use in conveying systems in which case the tracks would naturally be many times longer than the shoes. In a seat assembly of the character shown in which the tracks and shoes are of substantially the same length all of the cylindrical bearing elements are substantially enclosed by the shoe and tracks and no portions of the structure which might injure or soil the clothing of the occupant of the seat are exposed.

While I have described and illustrated but several embodiments of my invention, it will be apparent to those skilled in the art that various changes, omissions, additions and substitutions may be made therein without departing from the spirit and scope of my invention as set forth in the accompanying claims.

I claim:

1. Apparatus for movably supporting articles including a sheet metal track having spaced bearing recesses in one side, a member for supporting an article disposed adjacent said side of said track and shiftable relative thereto, a plurality of cylindrical bearing elements between said track and said member, one positioned in each recess and each having a peripheral portion extending beyond said side of said track, and a plurality of tongues struck out of the sheet metal of said track, each of said tongues being disposed over a portion of one of said bearing elements respectively for holding the latter against displacement from said track, said member being spaced from said tongue and having portions which contact and embrace said extended portions of said elements to prevent displacement of said member relative to said element.

2. Apparatus for movably supporting articles including a sheet metal track having spaced bearing recesses in one side, a plurality of cylindrical bearing elements, one positioned in each recess and each having a portion extending beyond said side of said track, a tongue struck from the portion of said track adjacent each recess and disposed over each cylindrical element respectively for holding the latter against displacement from said track, said tongues and cylindrical elements having interengaged beads and grooves disposed in planes extending transversely of the longitudinal axis of said cylindrical elements for holding the latter against axial movement relative to said track, and a member for supporting an article disposed adjacent said track and shiftable relative thereto, said member being spaced from said tongues and having portions which bear against and embrace said extending portions of said elements to prevent displacement of said member relative to said elements.

3. Apparatus for movably supporting articles, including a sheet metal track having spaced pairs of inwardly extending bearing sockets integral with said track and depressed from one side thereof, a plurality of cylindrical bearing elements, each having its opposite end portions positioned in one of said pairs of bearing sockets respectively, and each cylindrical bearing element having its periphery extending beyond said side of said track, means carried by said track for retaining said bearing elements within said recesses and a member for supporting an article disposed adjacent said track and shiftable relative thereto, said member being spaced from said retaining means and having portions which bear against and embrace said extending portions of said elements to prevent displacement of said member relative to said elements.

4. Apparatus for movably supporting articles, including a sheet metal track having spaced pairs of inwardly extending bearing sockets integral with said track and depressed from one side thereof, a plurality of cylindrical bearing elements, each having its opposite end portions positioned in one of said pairs of bearing sockets respectively, and each bearing element having a portion extending beyond said side of said track, a tongue struck from the sheet metal between each pair of bearing sockets and extending outwardly from said side of said track in engagement with respect to the cylindrical bearing elements mounted thereon, and a member for supporting an article disposed adjacent said track and shiftable relative thereto, said member being spaced from said tongue and having portions which bear against and embrace said extending portions of said elements to prevent displacement of said member relative to said elements.

5. Apparatus for movably supporting articles, including a sheet metal track having spaced pairs of inwardly extending bearing sockets integral with said track and depressed from one side thereof, a plurality of cylindrical bearing elements, each having a peripheral groove intermediate its end portions, and each having its end portions disposed in one of said pairs of bearing sockets respectively, and each bearing element having portions extending beyond said side of said track, a tongue struck from the sheet metal between said pair of bearing sockets and engaging the intermediate portions of the bearing elements therein respectively, and each tongue having a bead engaged in the groove of its associated cylindrical bearing element respectively for holding the latter against axial movement relative to said track, and a member for supporting an article disposed adjacent said track and shiftable relative thereto, said member being spaced from said tongue and having portions which bear against and embrace said extending portions from said elements to prevent displacement of said member relative to said elements.

6. In apparatus for movably supporting articles; a conveyor track including a sheet metal track channel having its open side secured to a supporting structure and having a plurality of spaced pairs of bearing sockets depressed inwardly from the sheet metal of said track adjacent the web thereof, portions of the sheet metal of said web between said bearing sockets being struck outwardly from the channel of said track, and a cylindrical bearing element positioned between each pair of bearing sockets and the associated struck-out portion of said web respectively and held thereby against displacement from said track.

7. In apparatus for movably supporting articles, a conveyor track including a body portion having spaced bearing recesses in one surface thereof, said recesses being open at the lateral sides of said body portion, a plurality of cylindrical bearing elements positioned in said recesses having bearing portions extending beyond said surface of said body portion, means engaging the intermediate portions of said bearing elements for holding the latter against displacement relative to said body portion, and a member for supporting an article disposed adjacent said track and shiftable relative thereto, said member being spaced from said holding means and having portions which bear against and embrace said extending portions of said elements to prevent displacement of said member relative to said elements.

8. In apparatus for movably supporting articles, a conveyor track including a body portion having spaced bearing recesses in one surface thereof, said recesses being open at the lateral sides of said body portion, a plurality of cylindrical bearing elements in said recesses having bearing portions extending beyond said surface of said body portion, means engaging the intermediate portions of the bearing elements for holding the latter against displacement relative to said body portion, said means and said bearing elements having interengaged beads and grooves for holding the latter against axial movement relative to said body portion, and a member for supporting an article disposed adjacent said track and shiftable relative thereto, said member being spaced from said holding means and having portions which bear against and embrace said member relative to said elements.

9. In combination with a movable seat having a fixed support and having means for confining its movement relative to said support to a predetermined course, seat adjusting mechanism including a supporting plate fixed to said seat, an operating lever pivotally mounted on said supporting plate, a bell crank lever pivotally mounted on said plate, means providing a pivotal sliding connection between one arm of said bell crank lever and said operating lever, and a system of levers pivotally connected with said bell crank lever and biased between said seat and said fixed support for constraining the pivotal movement of said bell crank lever about its pivotal axis and thereby urging said seat in the direction of its freedom of movement by rotation of said operating lever.

10. In apparatus for movably supporting articles, a conveyor track including a sheet metal channel having its open side secured to a supporting structure and having a plurality of spaced bearing sockets depressed inwardly from the sheet metal of said track adjacent the web thereof; portions of the sheet metal of said web adjacent said bearing sockets being struck outwardly from the channel of said track; and a cylindrical bearing element positioned between each bearing socket and an associated struck-out portion of said web respectively and held thereby against displacement from said track.

11. In apparatus for movably supporting articles, a conveyor track including sheet metal member adapted to be secured to a supporting structure and having a plurality of spaced bearing sockets depressed inwardly from the surface of said track; portions of the metal of said track adjacent said bearing sockets being struck outwardly from the surface of said track; and a cylindrical bearing element positioned between each bearing socket and an associated struck-out portion, respectively, and held thereby against displacement from said track.

AUGUST L. DE CARY.

CERTIFICATE OF CORRECTION.

Patent No. 2,064,592. December 15, 1936

AUGUST L. DE CARY.

It is hereby certified that error appears in the printed specification of the above numbered patent requiring correction as follows: Page 5, second column, line 59, claim 6, strike out the word "track"; and that the said Letters Patent should be read with this correction therein that the same may conform to the record of the case in the Patent Office.

Signed and sealed this 16th day of March, A. D. 1937.

Henry Van Arsdale
Acting Commissioner of Patents.

(Seal)